(12) United States Patent  
Godfrey et al.

(10) Patent No.: US 11,951,545 B2  
(45) Date of Patent: Apr. 9, 2024

(54) MODERATED NUCLEAR CASK COMPOSITE

(71) Applicant: MATERION CORPORATION, Mayfield Heights, OH (US)

(72) Inventors: Stuart Godfrey, Mayfield Heights, OH (US); Lawrence H. Ryczek, Mayfield Heights, OH (US); Andrew D. Tarrant, Mayfield Heights, OH (US)

(73) Assignee: Materion Corporation, Mayfield Heights, OH (US)

( * ) Notice: Subject to any disclaimer, the term of this patent is extended or adjusted under 35 U.S.C. 154(b) by 371 days.

(21) Appl. No.: 17/603,206

(22) PCT Filed: Apr. 10, 2020

(86) PCT No.: PCT/US2020/027632  
§ 371 (c)(1),  
(2) Date: Oct. 12, 2021

(87) PCT Pub. No.: WO2021/002915  
PCT Pub. Date: Jan. 7, 2021

(65) Prior Publication Data  
US 2022/0199273 A1    Jun. 23, 2022

Related U.S. Application Data

(60) Provisional application No. 62/833,016, filed on Apr. 12, 2019.

(51) Int. Cl.  
*G21F 5/008* (2006.01)  
*B22F 3/15* (2006.01)  
(Continued)

(52) U.S. Cl.  
CPC ............... *B22F 3/15* (2013.01); *B22F 5/10* (2013.01); *C22C 1/0416* (2013.01); *C22C 1/05* (2013.01);  
(Continued)

(58) Field of Classification Search  
CPC . G21F 5/012; G21F 5/02; G21F 5/008; G21F 1/08; B22F 3/15; B22F 5/10;  
(Continued)

(56) References Cited

U.S. PATENT DOCUMENTS

2002/0021779 A1    2/2002  Murakami  
2014/0219408 A1*   8/2014  Singh ................ G21F 5/008  
                                              376/272  
(Continued)

OTHER PUBLICATIONS

International Application No. PCT/US2020/027632, International Search Report dated Dec. 17, 2020, 3 pages.

*Primary Examiner* — Kiet T Nguyen  
(74) *Attorney, Agent, or Firm* — Cozen O'Connor

(57) ABSTRACT

A cask liner includes a hollow cylinder comprising a boron-containing composition. The hollow cylinder has no longitudinal joints. The hollow cylinder may be formed as a single unit by isostatic pressing, for example by hot isostatic pressing (HIP) of a blend of a boron-containing powder and an aluminum or aluminum alloy powder which is blended by mechanical alloying. Casked nuclear fuel includes a nuclear fuel rod comprising uranium, which is disposed in or extends through the hollow cylinder of the cask liner.

25 Claims, 9 Drawing Sheets

(51) Int. Cl.
*B22F 5/10* (2006.01)
*C22C 1/04* (2023.01)
*C22C 1/05* (2023.01)
*G21F 5/012* (2006.01)

(52) U.S. Cl.
CPC .............. *G21F 5/008* (2013.01); *G21F 5/012* (2013.01); *B22F 2301/052* (2013.01)

(58) Field of Classification Search
CPC ................ B22F 5/106; B22F 2301/052; B22F 2998/10; B22F 2999/00; C22C 1/0416; C22C 1/05; C22C 1/051; C22C 1/1084; C22C 29/062; Y02E 30/30
USPC ...................................................... 250/506.1
See application file for complete search history.

(56) References Cited

U.S. PATENT DOCUMENTS

| | | |
|---|---|---|
| 2015/0218681 A1 | 8/2015 | Choda |
| 2018/0025796 A1 | 1/2018 | Singh |
| 2018/0247720 A1 | 8/2018 | Singh |

\* cited by examiner

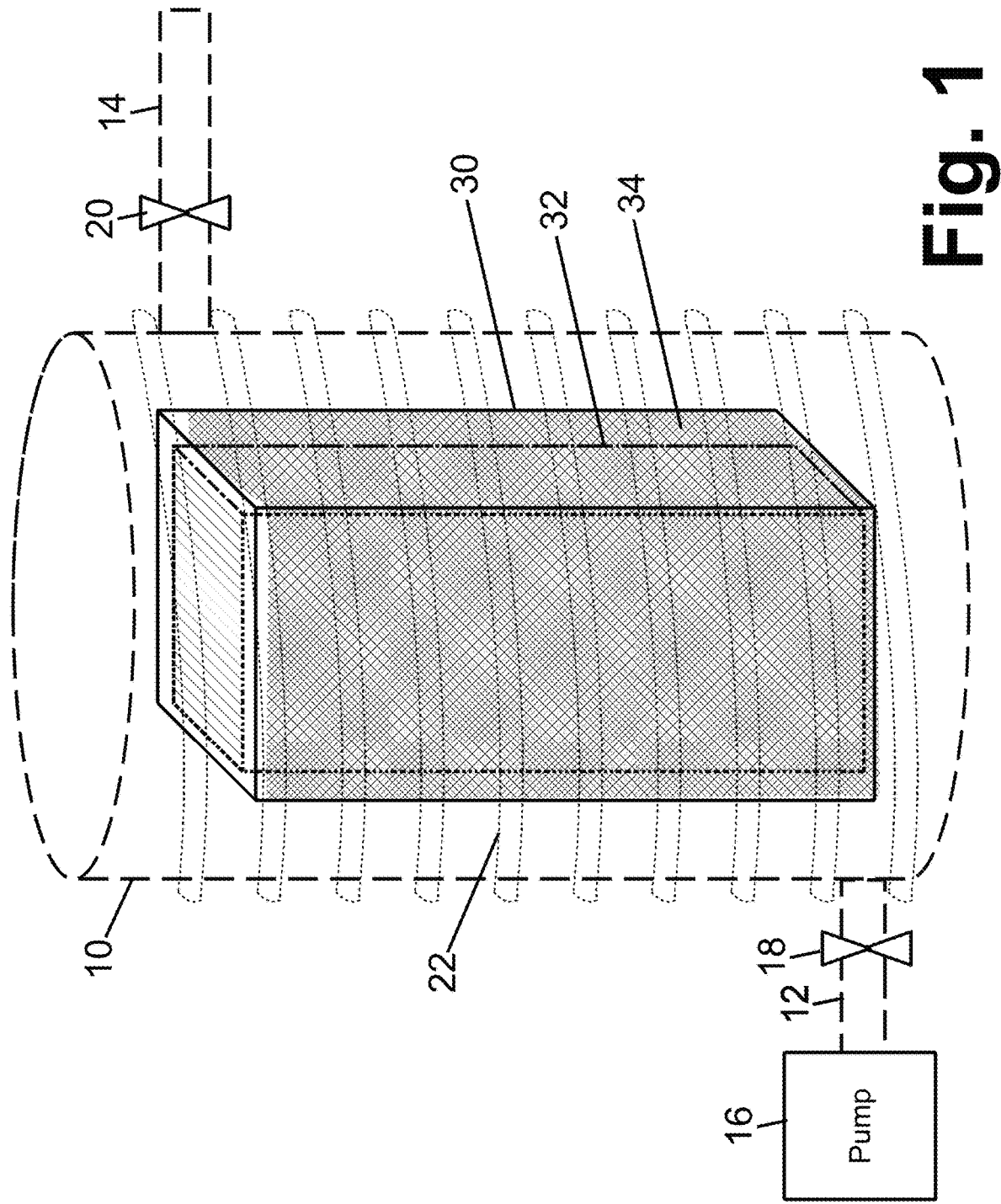

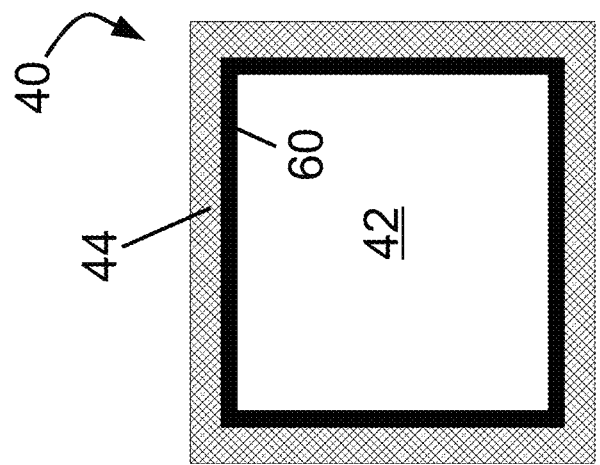
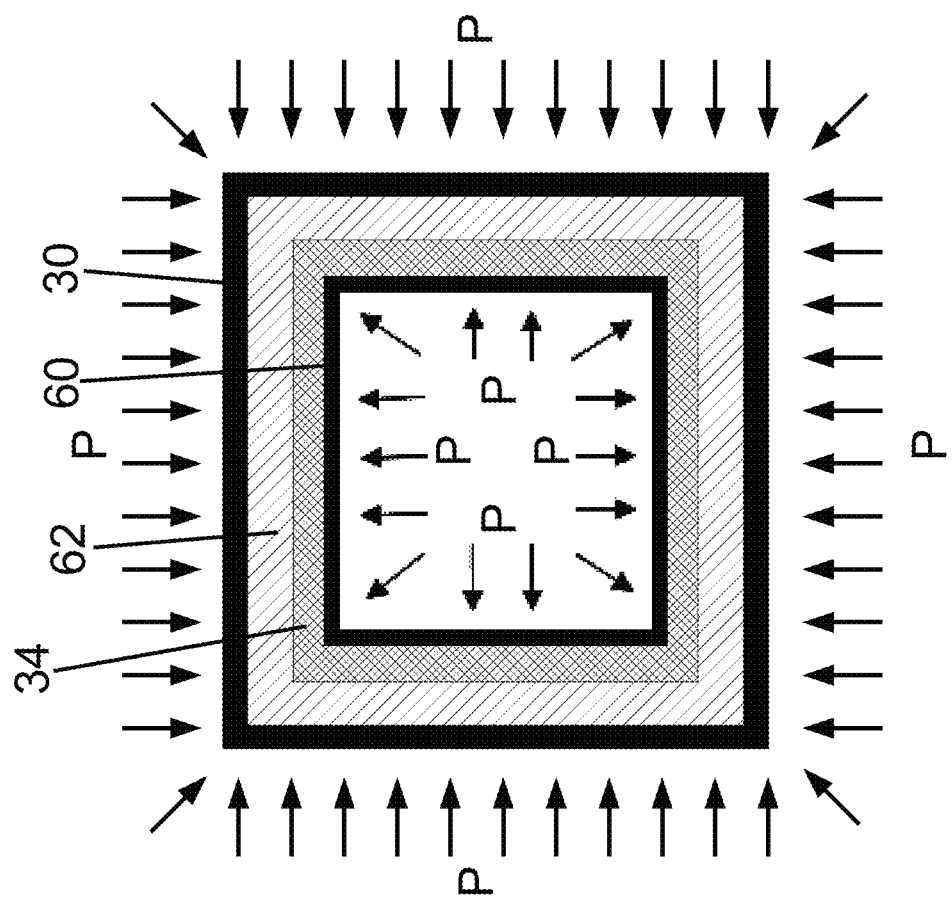
Fig. 7
Fig. 8 ly occurring boron is principally made up of the isotope $^{11}$B (about 80%), and the isotope $^{10}$B (about 20%). The $^{10}$B isotope is a strong neutron absorber, leading to the
MODERATED NUCLEAR CASK COMPOSITE This application is a national stage application of PCT/US2020/027632 filed on Apr. 10, 2020, which claims priority to U.S. Provisional Patent Application Ser. No. 62/833,016, filed Apr. 12, 2019, the contents of which are fully incorporated herein by reference.

BACKGROUND

The present disclosure relates to the radiation shielding arts, radiation shielding materials, nuclear fuel casks, and related arts, materials, processes, and devices.

Nuclear or fission reactors commonly use uranium fuel rods as fuel for the nuclear reaction. However, the nuclear chain reaction which splits radioactive $^{235}$U atoms produces radioactive fission products, some of which have relatively long half-life, leading to the spent nuclear fuel continuing to emit large quantities of heat and high levels of radiation long after removal from the nuclear reactor. Once removed from the nuclear core, these uranium fuel rods are still radioactive or "hot" and are still emitting neutrons. In order for the rods to be stored safely and to prevent further chain reactions from occurring, the spent fuel rods are placed inside isolating cells or cavities within special storage containers, commonly referred to as casks. The isolating cells within the storage casks are lined with a neutron absorbing material so that the neutron flux emitted from one uranium fuel rod cannot react with another uranium fuel rod so as to support a nuclear chain reaction and/or be emitting radiation to the external environment. Storage facilities can be cooled water storage ponds (sometimes used when fuel rods are first removed from the reactor core) or dry storage casks, e.g. encased by concrete. Dry storage is preferred once the rods have cooled sufficiently to no longer require active water cooling.

A commonly used neutron absorbing element is boron. Naturally occurring boron is principally made up of the isotope $^{11}$B (about 80%), and the isotope $^{10}$B (about 20%). The $^{10}$B isotope is a strong neutron absorber, leading to the usefulness of boron as a cask liner material. A common way to line the inside of spent fuel storage cask cells is with sheet materials containing boron, such as boron containing stainless steel sheets (where the boron is added as an alloying element during melting and casting) or boron carbide ($B_4C$) ceramic that is added to aluminum (Al) to make an Al metal matrix composite (MMC). A problem with using a boron containing stainless steel is that only 2% boron can be added to steel as an alloying element before the steel becomes too brittle to roll. By contrast, existing techniques for producing Al-$B_4$C MMC materials such as casting or powder blending and HIP sintering can produce materials containing higher concentrations of $B_4$C ceramic. This makes the Al-$B_4$C MMCs a more efficient volumetric absorber of neutrons compared with boron containing stainless steels. Al-$B_4$C MMCs are also considerably less dense than boron steel which can be an important consideration for transport casks. Even further, aluminum has higher thermal conductivity compared to steel which can be advantageous for heat management within the storage casks.

A common way to line the inside of a storage cask is with boron steel or Al-$B_4$C MMC sheets which are formed into strips, cut to width and joined together to line the cavity for each spent nuclear fuel rod. The neutron absorbing sheets can be joined together by welding or can be assembled by a mechanical technique such as machined and interlocking tabs. A consistent and even mix of boron is desired throughout the cask liner sheet so that neutron absorption is consistent. This boron consistency should also be maintained across any joints in the final cask structure in order to avoid neutron flux leakage at the joints.

In one conventional approach for manufacturing Al-$B_4$C MMC sheets, particulate $B_4$C ceramic is poured into molten aluminum which is then cast into Al-$B_4$C MMC blocks. The cast blocks are subsequently rolled to improve homogeneity of the $B_4$C particles and to produce the desired Al-$B_4$C MMC sheets for constructing the nuclear fuel storage cask liner. In this casting approach, the volume fraction of $B_4$C that can be added to the material is limited by difficulties in distributing $B_4$C ceramic in the molten aluminum. Also, casting techniques tend to work better with large ceramic sizes so this restricts the fineness of ceramic that can be used to reinforce the MMC material. Furthermore, the relatively low quality of cast materials, in terms of hot ductility, tends to result in lower rolling yields.

In another conventional approach for manufacturing Al-$B_4$C MMC known as powder blending, fine aluminum and $B_4$C powders are blended together and then consolidated into blocks by techniques such as sintering or hot isostatic pressing (HIP). The aluminum powders used in a powder blending process are typically 50-75 microns in diameter and the $B_4$C powders are typically 10-15 microns in diameter. Blending these two powders together produces a non-homogenous structure in which the $B_4$C ceramic decorates the aluminum powders. Due to the non-homogenous distribution of $B_4$C ceramic in the material, the consistency of neutron absorption across the area of the sheet may be variable. This material is typically further worked by being extruded and/or rolled into sheets, both to improve the distribution of $B_4$C ceramic within the structure and to produce the desired sheet form.

Brief Description

In one illustrative embodiment, a cask liner is disclosed for a nuclear fuel cask. The cask liner comprises a hollow cylinder comprising a boron-containing composition. The hollow cylinder has no longitudinal joints. The hollow cylinder may be of various cross-sectional shapes (e.g. square, rectangular, hexagonal, circular) and/or may be tapered longitudinally, and/or may include a bottom cover and/or a constricted top.

In another illustrative embodiment, a cask liner is disclosed for a nuclear fuel cask. The cask liner comprises a hollow cylinder (of various cross-sectional shapes, optionally tapered and/or having end constrictions/covers) comprising a boron-containing composition. The hollow cylinder is formed as a single unit by isostatic pressing. In some more specific embodiments, the hollow cylinder is formed as the single unit by hot isostatic pressing (HIP) of a mixture of a boron-containing powder and an aluminum or aluminum alloy powder which is a mechanical alloy.

In another illustrative embodiment, casked nuclear fuel is disclosed, including a nuclear fuel rod comprising uranium, and a cask liner as set forth in one or both of the two immediately preceding paragraphs. The nuclear fuel rod is disposed in or extends through the hollow cylinder of the cask liner.

In another illustrative embodiment, a method of manufacturing a cask liner for a nuclear fuel cask includes performing isostatic pressing to form a boron-containing composition into a cask liner comprising a hollow cylinder. Some more specific method embodiments employ hot isostatic pressing (HIP), and/or further include producing the boron-containing composition by mechanical alloying of a boron-containing powder and an aluminum or aluminum alloy powder. Various devices or systems enabled by the methods are also contemplated.

These are merely illustrative examples, and a given implementation may include none, one, two, more, or all aspects of the foregoing illustrative embodiments.

BRIEF DESCRIPTION OF THE DRAWINGS

The following is a brief description of the drawings, which are presented for the purposes of illustrating the embodiments disclosed as examples herein, and are not for the purposes of limiting the same.

FIG. 1 diagrammatically shows a near net shape hot isostatic pressing (NNS-HIP) system for forming a cask liner for spent nuclear fuel rods.

FIG. 7 diagrammatically shows a cross-sectional view of an alternative NNS-HIP process including indication by arrows of the isostatic pressure used to consolidate the Al-$B_4C$ powder material into a fully dense material.

FIG. 8 diagrammatically shows a cross-sectional view of a cask liner produced by the NNS-HIP processing of FIG. 7. This shows the NNS-HIP part with the inner HIP can material bonded onto the NNS HIP core. A variant on this with the inner HIP can removed is also contemplated.

DETAILED DESCRIPTION

Figure 3:
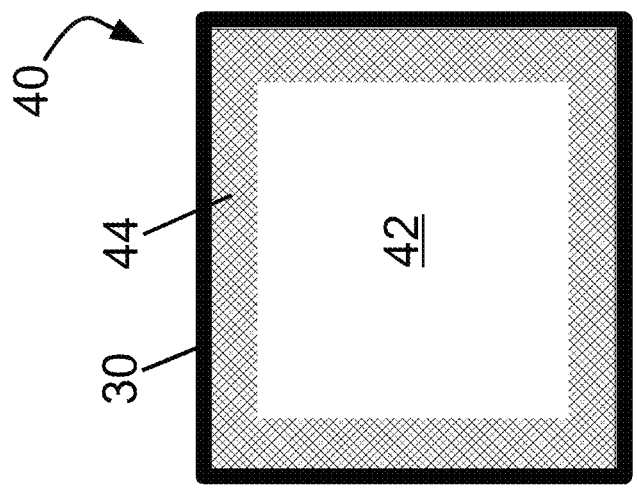
FIG. 3 diagrammatically shows a cross-sectional view of a cask liner produced by the NNS-HIP processing of FIGS. 1 and 2. This shows the NNS-HIP part with the outer HIP can material bonded onto the NNS HIP core. A variant on this with the outer HIP can removed is also contemplated.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" also encompass plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named components/ingredients/steps and permit the presence of other components/ingredients/steps. However, such description should be construed as also describing systems or devices or compositions or processes as "consisting of" and "consisting essentially of" the enumerated components/ingredients/steps, which allows the presence of only the named components/ingredients/steps, along with any unavoidable impurities that might result therefrom, and excludes other components/ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number.

The present disclosure may refer to temperatures for certain process steps. It is noted that these generally refer to the temperature at which the heat source (e.g. furnace) is set, and do not necessarily refer to the temperature which must be attained by the material being exposed to the heat.

For purposes of this disclosure, amounts of less than 0.01 wt % of these elements should be considered to be unavoidable impurities, i.e. their presence is not intended or desired.

The following examples are provided to illustrate the alloys, processes, articles, and properties of the present disclosure. The examples are merely illustrative and are not intended to limit the disclosure to the materials, conditions, or process parameters set forth therein.

In both conventional casting and powder blending approaches, extrusion and rolling of the cast or consolidated Al-$B_4C$ MMC blocks is performed to produce the desired sheet form for constructing the cask liner. The extrusion and rolling also serves as working of the block material in order to achieve a desired highly homogeneous distribution of the $B_4C$ ceramic in the aluminum.

However, it is recognized herein that these approaches have certain disadvantages. The manufacturing process leading to the final Al-$B_4$C MMC sheets is complex, including casting or blending/consolidation processing to produce the stock blocks, followed by extrusion and rolling processes to convert this material to Al-$B_4$C MMC sheets with homogeneous $B_4$C ceramic distribution. Yield can suffer especially during the rolling as stress fracturing or the like can lead to unusable sheets.

Furthermore, construction of the cask liner requires joining sheets, e.g. four sheets may be joined together to form a cylindrical cask liner with a rectangular cross-section. When this is done, the joints must be "neutron-tight", that is, gaps at joints between the Al-$B_4$C MMC sheets should be sealed to prevent leakage at the joints of neutron flux from the nuclear fuel stored in the cask. As the nuclear fuel is usually in the form of rods on the order of 5 meters in length, the requisite cask liner has long joints extending the entire (e.g. 5 meter) length of the rod, specifically four such longitudinal joints in the case of a rectangular cask liner. Further joints are present at top-and-bottom of the cast where top-and-bottom cask liner sheets are placed. The joints are typically sealed by way of welding of adjacent edges of the Al-$B_4$C MMC sheets or by a mechanical method such as machined and interlocking sheet materials.

In improvements disclosed herein, a cask liner is fabricated using near net shape (NNS) hot isostatic pressing (HIP), i.e. NNS-HIP. In this process Al-$B_4$C metal matrix composite (MMC) material is formed directly into the final shape of the cask liner using a shaped pressure vessel container or by being pressed by HIP against a shaped mandrel to produce an enclosed and continuous profile of neutron absorbing liner materials. NNS HIPing of a powder blend material is problematic as the distribution of $B_4$C may not be sufficiently homogenous or uniform. This can be addressed by extrusion and rolling to fully optimize the $B_4$C distribution, but such process steps add complexity to the manufacturing. Further to this, powder blend-only approaches have risk of segregation of the $B_4$C particles within the metal matrix, leaving risk of areas free of neutron shielding. Some embodiments disclosed herein instead achieve the desired high homogeneity in a powder form suitable for subsequent NNS-HIP processing by using mechanical alloying which defines the distribution in a powder form with a highly uniform distribution of $B_4$C. For example, the cask liner may be formed by NNS-HIP directly as a cylinder (with one or both ends open) with a rectangular, hexagonal, circular, or any other chosen cross-section. Advantageously, because the mechanical alloying has already optimized the $B_4$C distribution, no further processing of the cask liner, such as extrusion and/or rolling, is employed. Further, there are no longitudinal joints along the length of the cylindrical cask liner. Optionally, the cask liner may be formed by NNS-HIP with a closed bottom, thereby also eliminating the joints at which the bottom Al-$B_4$C MMC sheet is conventionally placed. The top and/or bottom may be formed with an inward flange or constriction defining a reduced opening that is only large enough for the nuclear fuel rod to be inserted inside the cask liner; thereafter, a single Al-$B_4$C MMC sheet is placed over this constricted opening with substantial overlap, thereby eliminating any potential neutron flux leakage paths.

Variations on this NNS processing approach are not limited to HIP densification approaches. The use of NNS shape methods to form structures that are vacuum sintered or cold isostatic pressed (CIP) and then either vacuum sintered or HIP processed are also contemplated. The vacuum sintering or CIP combined with vacuum sintering approach may not completely remove porosity between composite powders but it could offer acceptable performance at reduced cost of manufacture. Although the resulting material may not be fully dense using a CIP and/or vacuum sintering approach the distribution of $B_4$C powders will still be homogeneous.

As previously noted, the use of extrusion and rolling in conventional cask liner sheet manufacturing has the dual purposes of providing the desired (for those processes) sheet form factor and also homogenization of the Al-$B_4$C ceramic power in the Al-$B_4$C MMC sheet. In the disclosed NNS-HIP process, to achieve homogenization of the Al-$B_4$C power in the Al-$B_4$C MMC, in some embodiments mechanical alloying is used to produce the Al-$B_4$C MMC material that undergoes the NNS-HIP processing. Mechanical alloying entails solid-state powder processing in which repeated cold welding, fracturing, and re-welding of blended powder particles is performed in a high-energy ball mill to produce homogeneous material, in this case homogeneous Al-$B_4$C MMC powder material. The amount of cold working in the mechanical alloying is suitably chosen to obtain the desired level of homogenization. In the mechanical alloying process, metal and ceramic powders should be mixed with a high energy technique to distribute the ceramic reinforcement particles into the metal matrix. Suitable techniques for this mixing include ball milling, mechanical attritors, teamer mills, rotary mills and other methods to provide high energy mixing to the powder constituents. Mechanical alloying should be completed in an atmosphere to avoid excessive oxidation of powders preferable in an inert atmosphere using nitrogen or argon gas. The processing parameters should be selected to achieve an even distribution of the ceramic particles in the metallic matrix.

With reference to FIG. 1, hot isostatic pressing (HIP) is performed to form a boron-containing composition into a cask liner comprising a hollow cylinder. FIG. 1 illustrates the HIP apparatus, which includes a pressure vessel 10 having a gas inlet 12 and a gas outlet 14. Note that the pressure vessel 10 is represented using dashed lines and in false transparency to reveal components contained therein. The process gas for applying isostatic pressure is typically argon, although another working gas may be used. The inlet 14 is connected with a suitable source of pressurized working gas, e.g. pressurized argon, by way of a pump 16 or other pressurization means, and suitable inlet and outlet valves 18, 20 and/or other flow control are provided for controlling flow of the pressurized working gas to maintain a desired isostatic pressure inside the pressure vessel 10. An elevated temperature is maintained by way of a suitable heating mechanism such as an illustrative resistive heating coil 22 (represented by dotted lines and in false transparency in FIG. 1) although a convective furnace or any other suitable heating mechanism may be employed.

Figure 2:
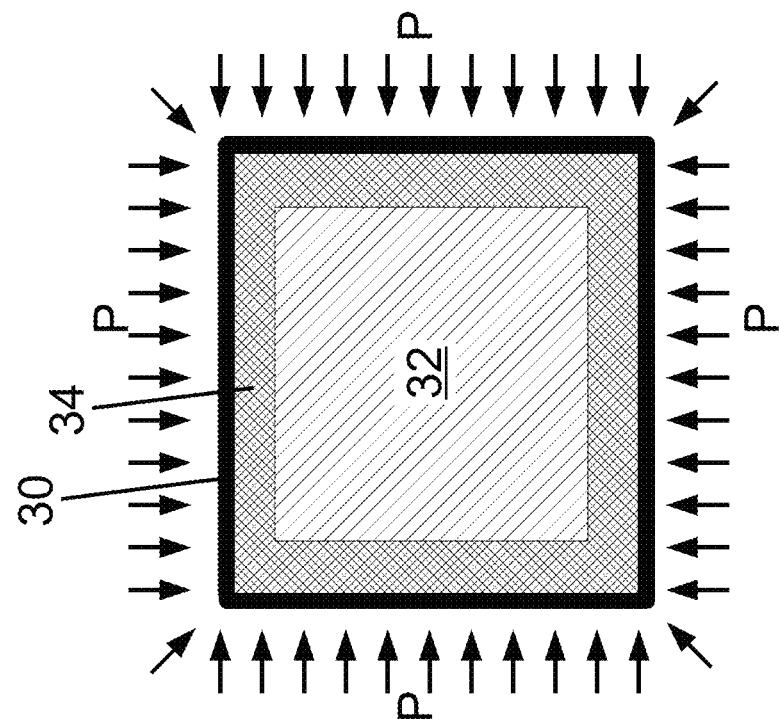
FIG. 2 diagrammatically shows a cross-sectional view of the NNS-HIP processing of FIG. 1 including indication by arrows of the isostatic pressure used to consolidate the Al-$B_4C$ powder material into a fully dense material.

With continuing reference to FIG. 1 and with further reference to FIG. 2, the HIP is performed to form the hollow cylinder of the cask liner as a single unit which has no longitudinal joints. To this end, a sealed container 30 is placed inside the pressure vessel 10. The illustrative sealed container 30 is indicated by solid lines in FIGS. 1 and 2, and has a rectangular cross-section as shown in FIG. 2, and in some embodiments is made of aluminum or an aluminum alloy, although other metals or materials with suitable sealing integrity and deformability as discussed below may be used. The thickness of the aluminum or aluminum alloy material used to form the sealed container (HIP can) 30 is chosen so that it performs adequate and reliable sealing during the HIP process but at the same time does not change or dilute the neutron absorbing performance of the final NNS part. For example thicker container walls dilute the average concentration of $B_4C$ within the final part. Within the sealed container 30 is disposed a mandrel 32, e.g. made of a steel, stainless steel, or other material that is substantially non-deforming at the isostatic pressure level employed in the HIP. The mandrel 32 is indicated in FIG. 1 by dot-dash lines, and in FIG. 2 by slant-hatching, and serves to define the shape of the hollow cylinder of the HIP-formed cask liner. Further, a boron-containing composition 34 fills most or all of an annular space defined between the inside wall of the sealed container 30 and the outside of the mandrel 32. The boron-containing composition 34 is indicated in FIGS. 1 and 2 by cross-hatching. As best seen in FIG. 2, which shows a cross-section of the sealed container 30 and the mandrel 32 and the boron-containing composition 34, the pressurization of the pressure vessel 10 exerts an isostatic pressure P against the sealed container 30. This sealed container 30 is made of a material which is strong enough to maintain its integrity under the isostatic pressure P (that is, the container 30 does not crack, split, or otherwise rupture under the isostatic pressure P) but which deforms in order to transfer the isostatic pressure P to the contained contents, namely to the boron-containing composition 34 and thence to the mandrel 32. As the mandrel 32 is substantially non-deforming at the exerted isostatic pressure P, this results in the isostatic pressure P pressing the boron-containing composition 34 against the non-yielding surface of the mandrel 32. At the same time, the heat source 22 is applying heat to maintain the boron-containing composition 34 at a desired temperature of the HIP process. This heat and the isostatic pressure P combine to form the boron-containing composition 34 into a solid hollow cylinder whose inner diameter is defined by the mandrel 32. In a typical process, the boron-containing composition 34 is a mixture of a boron-containing powder and an aluminum or aluminum alloy powder (and hence the boron-containing composition 34 is itself a composite powder) and this composite powder is fused by the combination of heat from the furnace 22 and the isostatic pressure P into a solid hollow cylinder whose inner hollow region is defined by the mandrel 32. Additionally, the combined heat and isostatic pressure P operates to fuse the container 30 onto the outside of the solid hollow cylinder.

With reference to FIG. 3, upon completion of the HIP and appropriate cool down and pump-out of the working gas (e.g. argon), the sealed container 30 is removed from the pressure vessel 30 and a top end is removed (e.g. cut off) and the mandrel 32 is removed. This leaves a cask liner 40. The cask liner 40 is shown in cross-section in FIG. 3 and includes the (remainder of) the container 30 fused onto the outside of the hollow cylinder 44 which is the boron-containing composition 34 after fusion by the HIP to form the hollow cylinder 44. This hollow cylinder 44 has a hollow interior space 42 corresponding to the space vacated when the mandrel 32 was removed. The inner mandrel maybe solid and formed of one piece of material or the mandrel maybe be multi-part to allow easier removal and re-use of the mandrel after HIP processing. The container 30 is retained in the example of FIG. 3, but alternatively may be cut away. If retained in the final cask liner 40, the container 30 can serve various purposes depending upon its thickness and composition. For example, the container 30 may serve as structural reinforcement of the cask liner 40, and/or as an outer liner to prevent contamination. In other contemplated embodiments, if the container 30 is sufficiently rigid then it can define the cask itself, so that the product 40 is actually a cask including a rigid outer structural component 30 and an inner cask liner layer 40.

The above-described HIP is sometimes referred to as near-net shape HIP, i.e. as NNS-HIP. The NNS-HIP process of FIGS. 1 and 2 produces the cask liner as a single unit by hot isostatic pressing (HIP). Advantageously, the hollow cylinder 44 thus produced has no longitudinal joints. A joint is a surface at which two or more mechanical or structural components (sometimes called "work pieces" in the welding, brazing, or soldering technologies) are united. Some common examples of a joint include a weld joint, a braze joint, or a solder joint. The skilled artisan can readily identify a joint by distinctive joint features such as an identifiable junction region containing voids, filler material (in the case of a joining technology such as brazing or soldering), characteristic chemical impurities, or so forth, and/or a discontinuity in the underlying material that is characteristic of the particular type of joint (e.g. weld joint, braze joint, solder, joint, or so forth). The skilled artisan will readily recognize that the hollow cylinder 44 produced by the NNS-HIP has no longitudinal joints, as the hollow cylinder 44 is formed as a single unit by the NNS-HIP. (By contrast, in conventional cask liner fabrication, sheets of neutron-absorbing material are welded together to form a hollow cylinder, e.g. four sheets may be welded together to form a hollow cylinder with a rectangular cross-section—in this case there are four longitudinal joints corresponding to the four weld joints that join the four sheets together to form the hollow rectangle).

Figure 4:
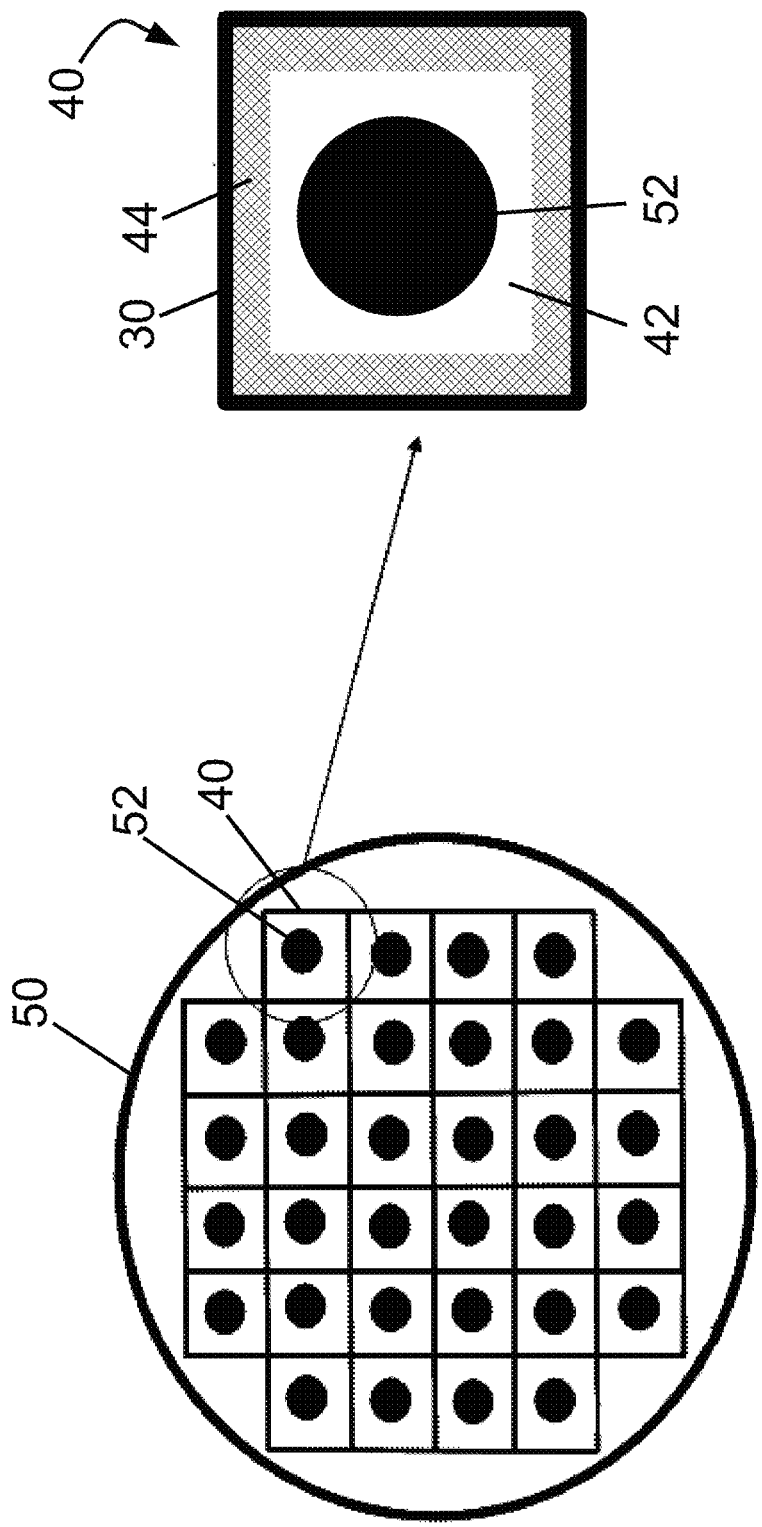
FIG. 4 diagrammatically shows a cross-section of a spent nuclear fuel cask (left-hand side of FIG. 4) and of one individual nuclear fuel rod enclosed by a cask liner (right-hand side of FIG. 4).

With reference now to FIG. 4, a schematic diagram is shown on the left-hand side of FIG. 4 indicating the cross section of a typical storage cask 50 containing (i.e. casking) a number of nuclear fuel rods 52 each comprising uranium. As the fuel rods 52 are typically spent fuel rods that have been used as fuel in a nuclear reactor to produce electricity, the nuclear fuel rods 52 may be somewhat depleted in radioactive $^{235}U$ isotope and may further comprise various radioactive fission products that are produced by fission reactions involving $^{235}U$ or subsequent fission reactions, and some of these fission products have relatively long half-life, leading to the spent nuclear fuel rods 52 continually emitting substantial quantities of heat and high levels of radiation. In the casking arrangement depicted in FIG. 4, each fuel rod 52 is individually isolated by a corresponding cask liner 40 which as indicated on the right-side of FIG. 4 may be the cask liner 40 already described with reference to FIG. 3 but now containing the fuel rod 52 or having the fuel rod 52 passing through the hollow cylinder 44. It is alternatively contemplated to dispose two or more nuclear fuel rods together in a single cask liner 40 so long as the aggregation of the multiple fuel rods stored in a single cask liner do not have a total mass comparable with a critical mass for nuclear chain reaction.

As previously noted, the boron-containing composition 34 is suitably a mixture of a boron-containing powder and an aluminum or aluminum alloy powder. The boron-containing powder may, for example, be $B_4C$, boron nitride (BN), or another boron-containing ceramic (e.g. titanium diboride, hafnium diboride). In some embodiments, the boron-containing composition is a boron-containing aluminum metal matrix composite (Al-MMC) such as a $B_4C$ aluminum metal matrix composite (Al-$B_4C$ MMC). In some embodiments, the boron-containing composition 34 is a composite mix of a boron-containing powder and an aluminum or aluminum alloy powder which is consolidated by mechanical alloying, e.g. an Al-MMC or in some more specific embodiment an Al-$B_4C$ MMC which is produced by mechanical alloying of $B_4C$ or another boron-containing powder and an Al or Al alloy powder. Advantageously, mechanical alloying allows for generation of a composite powder that can fill most or all of the space between the inner wall of the sealed container 30 and the mandrel 32; yet, at the same time the mechanical alloying provides the mechanism to distribute the boron-containing powder in a homogeneous way within the Al or Al alloy matrix. Hence, the mechanical alloying beneficially serves the same homogenization role that extrusion and rolling serves in manufacturing the boron-containing sheets that are used in conventional cask liner manufacture.

Furthermore, mechanical alloying of boron-containing powder and an aluminum or aluminum alloy powder can advantageously incorporate a high level of boron into the resultant boron-containing composition 34. For example, in some embodiments the boron-containing composition 34 comprises at least 10 wt % boron. In some embodiments, the boron-containing composition 34 comprises at least 40 wt % boron. In some embodiments, the boron-containing composition 34 comprises at least 60 wt % boron. In some embodiments, the boron-containing composition 34 comprises between 10 wt % and 70 wt % boron inclusive (i.e. including the endpoints of this range). Higher volume fractions of $B_4C$ are not possible in blend-only powder metallurgy based materials as at higher levels the $B_4C$ concentrates (decorate) at the boundaries between the aluminum powders producing a high concentration of $B_4C$ powders at this location. This inhomogeneous and high distribution of $B_4C$ ceramic limits further working such as extrusion or rolling.

While mechanical alloying has substantial advantages as detailed above, more generally the boron-containing composition 34 may be produced by any process that provides a sufficiently high boron concentration in the composition 34 with sufficient homogeneity to satisfy the neutron shielding specifications for a specific cask application.

Another advantage of the disclosed NNS-HIP approach for forming the cask liner is that it provides great flexibility in design of the cask liner, and for providing a hollow cylindrical cladding comprising aluminum or an aluminum alloy on an inside surface and/or on an outside surface of the hollow cylinder. Some further examples follow.

Figure 6:
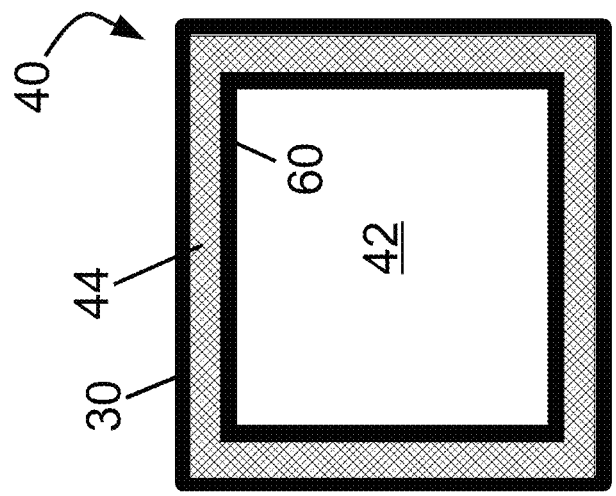
FIG. 6 diagrammatically shows a cross-sectional view of a cask liner produced by the NNS-HIP processing of FIG. 5. This shows the NNS-HIP part with both the outer and inner HIP can material bonded onto the NNS HIP core. Variants on this with the outer HIP can removed, or the inner HIP can removed, or both inner and outer HIP cans removed, are also contemplated.
Figure 5:
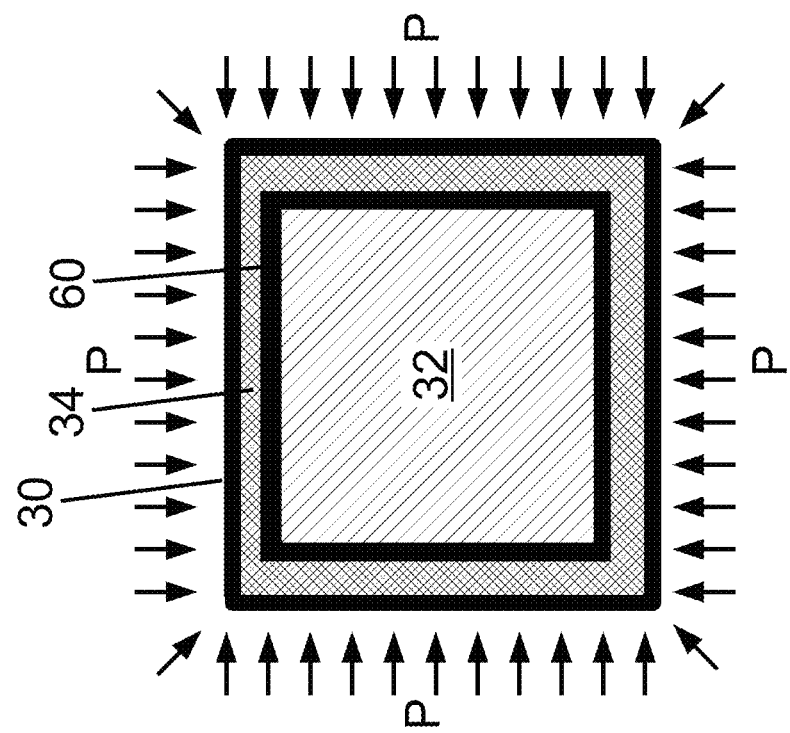
FIG. 5 diagrammatically shows a cross-sectional view of an alternative NNS-HIP process including indication by arrows of the isostatic pressure used to consolidate the Al-$B_4C$ powder material into a fully dense material.

With reference to FIGS. 5 and 6, the embodiment depicted in these drawings corresponds to that shown in corresponding FIGS. 2 and 3, respectively, except that in the embodiment of FIGS. 5 and 6 an additional hollow cylindrical cladding 60 is provided on the inside surface of the hollow cylinder 44. As seen in FIG. 5, this is achieved by disposing the hollow cylindrical cladding 60 between the mandrel 32 and the boron-containing composition 34. The HIP then operates to fuse the hollow cylindrical cladding 60 to the inside surface of the hollow cylinder 44 produced by the powder fusion. In this embodiment, the hollow cylindrical cladding 60 does not form any part of the pressure boundary of the sealed container 30; rather, the hollow cylindrical cladding 60 in this embodiment is a component disposed inside the sealed container 30. As seen in FIG. 6, the resulting cask liner 40 has both outer and inner hollow cylindrical claddings 30, 60. The aluminum or aluminum alloy cladding layers are HIP diffusion bonded on the Al-$B_4C$ core material and this provides a robust and stable joint between the clad layers and Al-$B_4C$ NNS HIP core.

With reference to FIGS. 7 and 8, in another embodiment the solid mandrel 32 is replaced by a hollow cylindrical mandrel 62, and the sealed container 30 now has a cylindrical open central region bounded by an inner wall 60 which in this embodiment (in contrast to the embodiment of FIGS. 5 and 6) forms a pressure boundary of the sealed container, together with the outer wall 30. In other words, in this embodiment the sealed container is defined by walls 30, 60 and has an annular sealed volume containing the annular mandrel 62. In this embodiment, the boron-containing composition 34 is disposed in a space within the sealed container 30, 60 between the inner wall of the annular mandrel 62 and the inner wall 60 of the sealed container 30, 60. The isostatic pressure P is applied to both the outer wall 30 and the inner wall 60 of the sealed container 30, 60, and it is particularly the isostatic pressure P applied to the inner wall 60 that operates to press the boron-containing composition 34 outward against the inner wall of the annular mandrel 62 to fuse the boron-containing composition 34 to form the hollow cylinder 44, and also serves to fuse the inner wall 60 of the container 30, 60 against the inner wall of the hollow cylinder 44. When the HIP is complete, the contents inside of the annular mandrel 62 are removed to provide the cask liner 40 with the hollow cylinder 44 of neutron-absorbing material with an inner hollow cylindrical cladding 60 which is the inner wall of the container 30, 60. The annular mandrel can be a solid one piece construction or the annular mandrel that can be a multi-part construction. Multi-part mandrel constructions aid removal of the mandrel after HIP and also allow the mandrel to be re-used after HIP processing. Moreover, in a further variant (not shown), the mandrel 62 shown in FIG. 7 is omitted entirely, in which case the HIP processing of the boron-containing composition 34 defines the shape of the cask liner entirely by the shape of the inner and outer HIP cans, i.e. the shape is defined entirely by the container 30, 60.

The NNS-HIP process advantageously eliminates longitudinal joints parallel to the cylinder axis of the hollow cylinder 44 making up the cask liner 40. The NNS-HIP process optionally also can provide for sealing of one end of the cask liner. Although not visible in the views provided in FIGS. 1 and 2, it is contemplated for the mandrel 32 to be positioned in the sealed container 30 with a lower plenum space between the bottom of the mandrel 32 and the bottom of the sealed container 30 which lower plenum space is also filled with the boron-containing composition 34. In this case, the NNS-HIP produces the cask liner 40 further including a cover comprising the boron-containing composition disposed at the bottom end of the hollow cylinder 44 and sealing the end of the hollow cylinder 44. In this case, there are again advantageously no joints between the cover and the end of the hollow cylinder.

Figure 9:
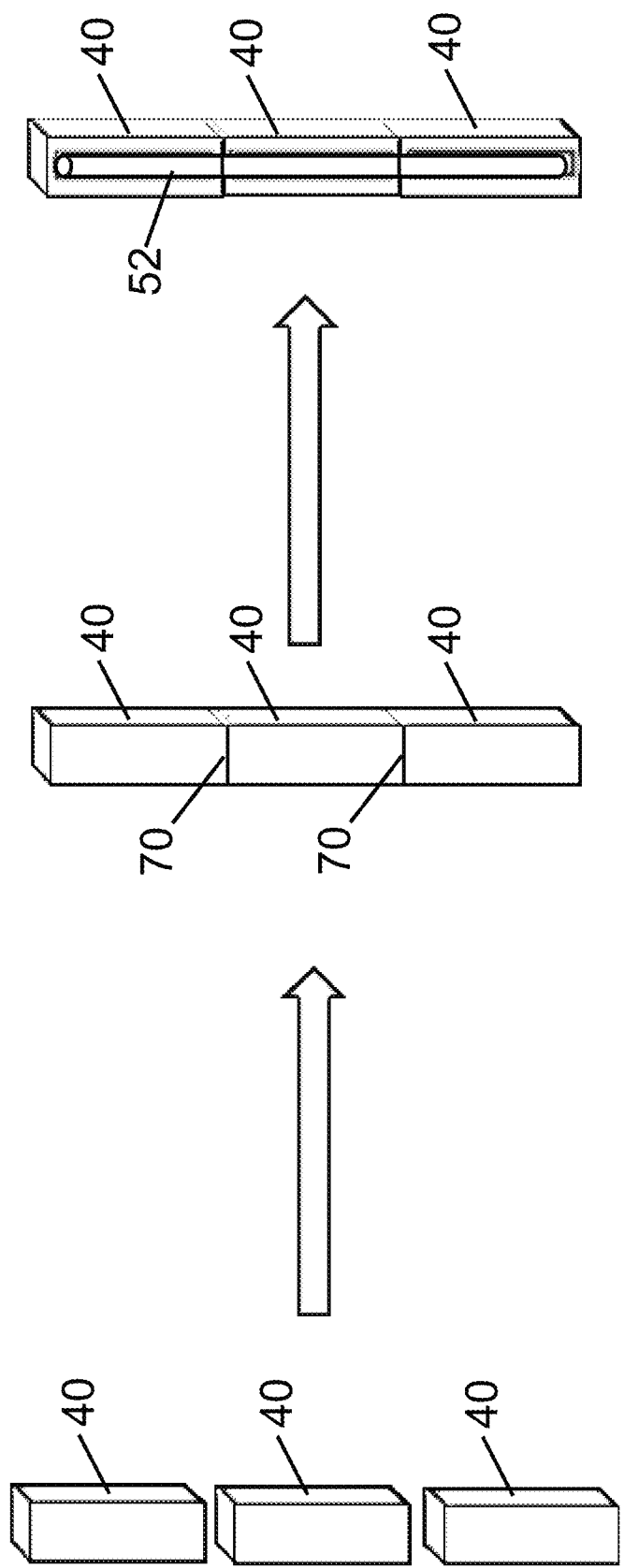
FIG. 9 diagrammatically shows stacking of three cask liner sections to provide cask lining for a nuclear fuel rod that is longer (longitudinally, i.e. in length) than an individual cask liner section.

With reference now to FIG. 9, in practice it is sometimes specified that the cask liner be manufactured with a shorter height (i.e. longitudinal length) than the height (i.e. longitudinal length) of the nuclear fuel rod 52 that is to be casked. To accommodate this, two or more (illustrative three) cask liners 40 may be stacked to provide sufficient height (i.e. longitudinal length) to cask the entire fuel rod 52. In such a case, there are joints 70 at the junctions between adjacent cask liners 40, as labeled in the middle diagram of FIG. 9.

Figure 10:
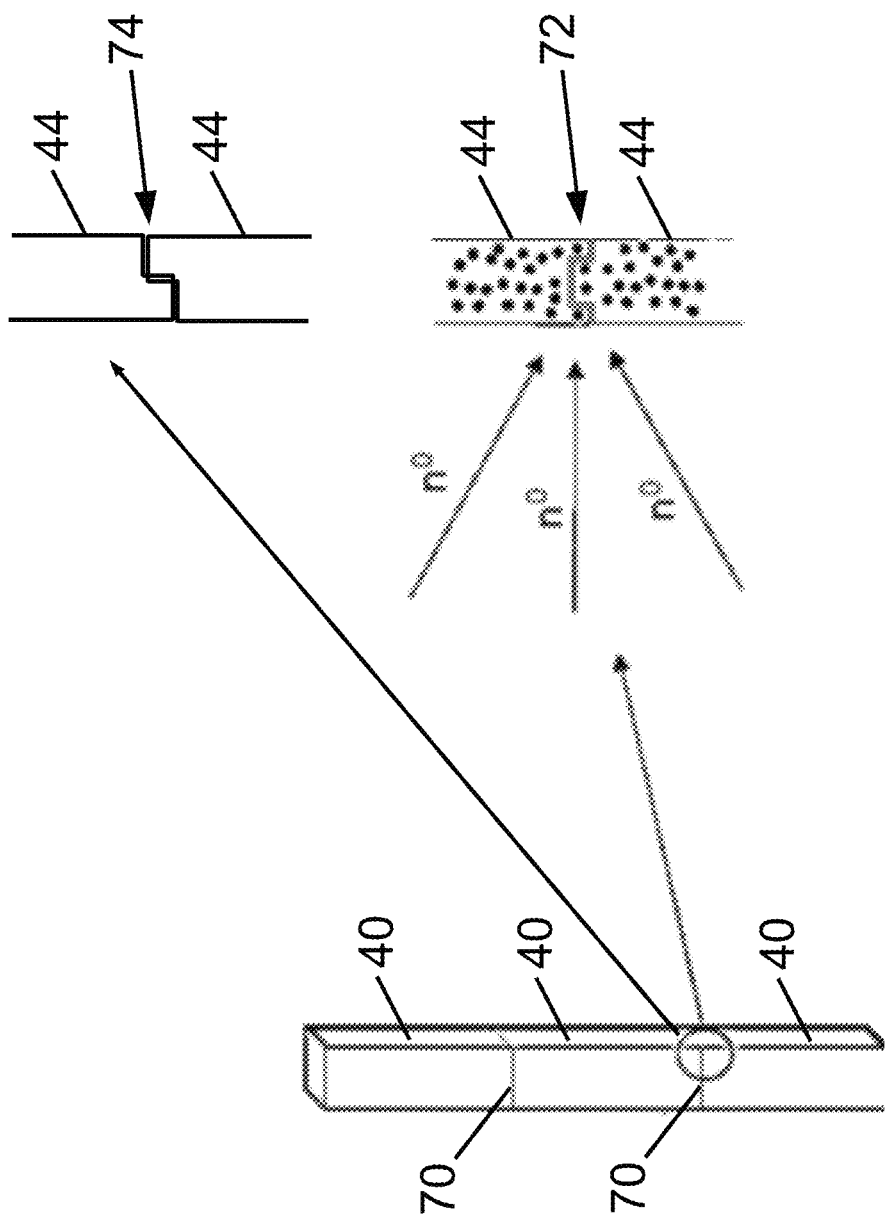
FIG. 10 diagrammatically shows some illustrative tortuous joints between abutting ends of neighboring cask liner sections which are achievable using the disclosed NNS-HIP cask liner fabrication process.

With reference to FIG. 10, when using the cask liners 40 produced by NNS-HIP as disclosed herein, it is possible to reduce or eliminate this neutron flux leak path by providing an end of the hollow cylinder 44 which has a recess and/or protrusion. In this case, when two hollow cylinders 44 are arranged end to end, the recess and/or protrusion of the proximate ends can engage to define a tortuous path extending from inside the hollow cylinders 44 to outside the hollow cylinders 44. Two examples are shown in FIG. 10 as joint 72 and joint 74. Forming the complex joints 72 or 74 by the NNS-HIP process is straightforward, simply entailing constructing the sealed container 30 or sealed container 30, 60 and mandrel 32 or 62 with the ends defining the desired recess(s) and/or protrusion(s). The tortuous path ensures that the neutrons, which travel along straight lines, cannot pass through the tortuous path without encountering the neutron-absorbing material of the cask liner 40. The tortuous path principle could also be achieved with an extra piece of material that slots into both hollow cylinders, for example an embodiment could include each hollow cylinder having a recess machined into the end and a matching insert that fits into both recesses.

Figure 11:
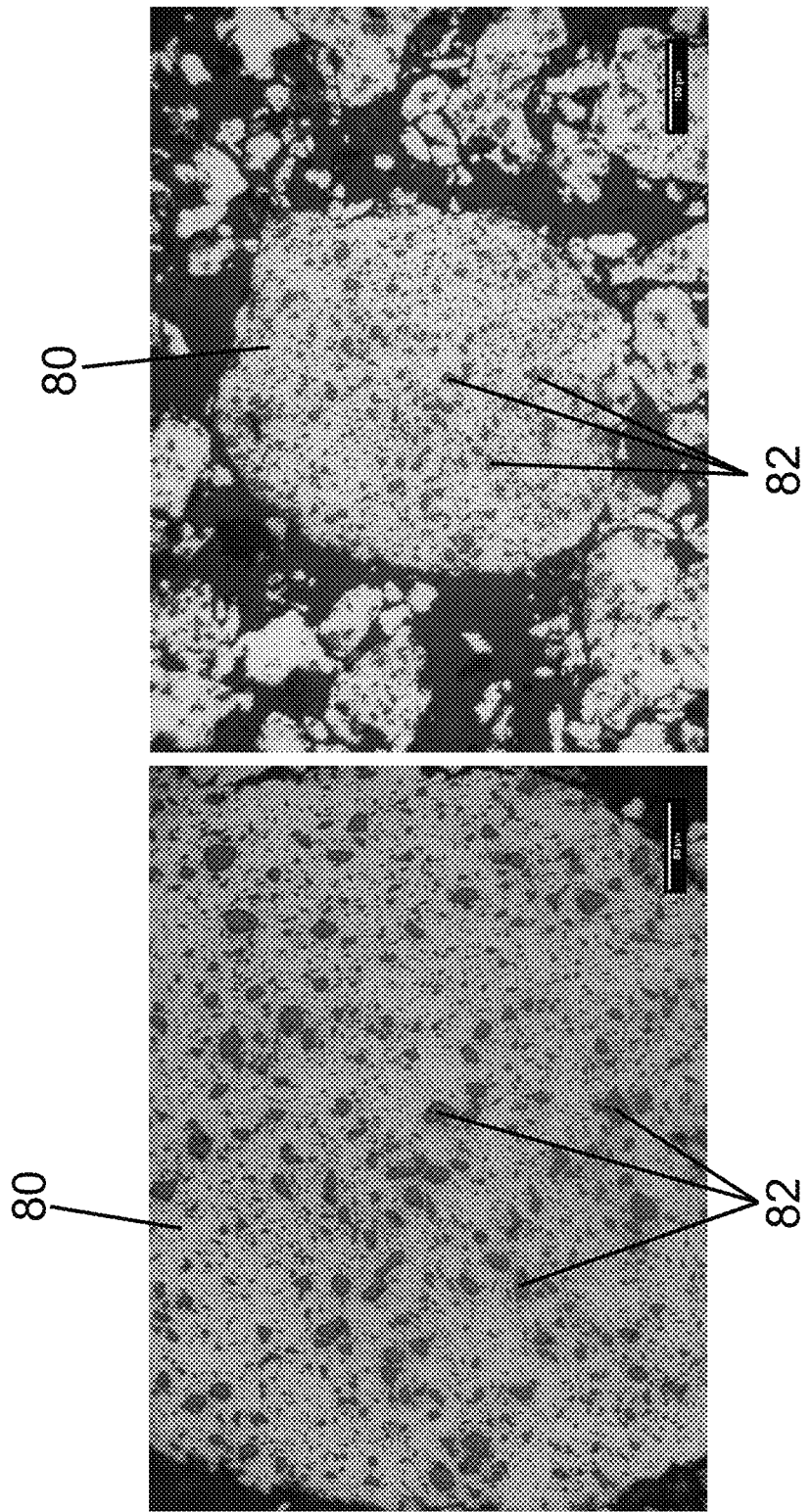
FIG. 11 shows two illustrative optical micrographs of a $B_4C$ aluminum metal matrix composite (Al-$B_4C$ MMC) produced by mechanical alloying of $B_4C$ ceramic powder and aluminum powder.

With reference to FIG. 11, two illustrative optical micrographs are shown of a $B_4C$ aluminum metal matrix composite (Al-$B_4C$ MMC) produced by mechanical alloying of $B_4C$ ceramic powder and aluminum powder. The left-hand micrograph has about twice the magnification of the right-hand micrograph (50 micron and 100 micron scale bars are annotated to the left- and right-hand micrographs, respectively). In the micrographs, aluminum powder grains 80 appear as light-colored grains (the same single Al grain is the centerpiece of both micrographs) while the smaller $B_4C$ grains 82 appear as dark grains. (Note, voids between the Al grains 80 also appear dark). As seen in the micrographs, a good homogenous mix of $B_4C$ ceramic within the aluminum matrix is achieved by mechanical alloying.

Figure 12:
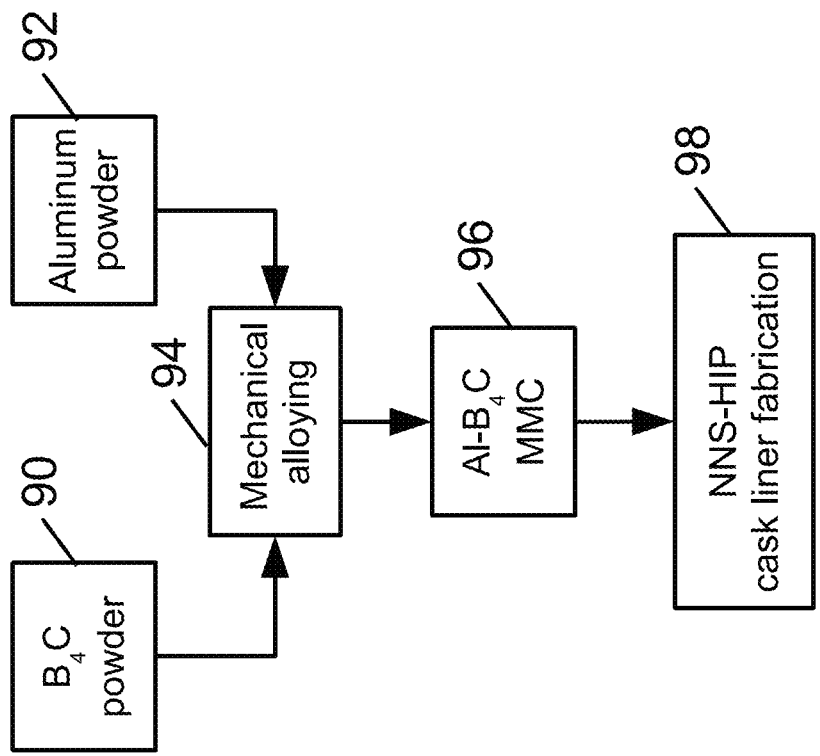
FIG. 12 shows a flowchart of an illustrative NNS-HIP manufacturing process presented at a high level.

With reference to FIG. 12, an illustrative manufacturing process is shown. A $B_4C$ powder 90 and an aluminum powder 92 are blended or consolidated by mechanical alloying 94 or otherwise combined to produce an Al-$B_4C$ MMC 96. As previously noted other boron containing powders such as BN powder, and/or other matrix powders such as an aluminum alloy powder, may be used; and furthermore a mixing process other than mechanical alloying is contemplated. In an operation 98, NNS-HIP is performed to form the Al-$B_4C$ MMC 96 into the cask liner of desired shape, including a hollow cylinder with no joints.

The disclosed NNS-HIP fabrication approach has numerous advantages. The NNS processing to produce a shaped liner removes the expense of hot extrusion and hot rolling of Al-$B_4C$ MMC material into sheets prior to assembling into the storage casks. This offers a cost advantage over current techniques. In some embodiments, the HIP process may not provide precisely the ideal shape—in such cases, the shape can be lightly worked to provide the precise desired shape. This still retains the advantage that the HIP process provides a shape that is close to the desired final shape.

Because the material is shaped by the NNS-HIP, there are no gaps at the edges of the square or hexagonal (or other shaped) liner sheets. With a cask liner produced by assembling sheet of neutron-absorbing material, any joints between the assembled sheets must be managed carefully as any gaps are a potential neutron flux leakage paths which in turn can give rise to uncontrolled nuclear chain reactions between neighboring casked nuclear fuel rods. The disclosed NNS-HIP approach avoids these joints entirely, and therefore offers a design and reliability advantage.

Storage casks are typically 5 m high for standard fuel rod lengths, and hence neutron absorbing liners must also be 5 m (or more) in length. Although the disclosed NNS-HIP approach can avoid longitudinal joints, if the HIP sections are less than 5 m long (for example, around 1.5-2.0 m is typically achievable using existing HIP processing chambers) then joints 70 are required between sections, as shown in FIG. 9. However, the total joint length of these joints 70 is considerably less than the total joint length when using a conventional sheet approach for fabricating the cask liner. For reference, fuel cell cavities in casks are typical 250 mm square by 5 m (5,000 mm) long. So conventional cask sections based on a 4 sheet approach would have approximately 20 m of total joint length per cavity to manage by welding or another joining technique. An approach using 4 sections manufactured by NNS-HIP as disclosed herein with the sections welded together end to end as shown in FIG. 9 to form a 5 m long liner would only have 3 m of total joint length to manage, e.g. weld. This represents an 85% reduction in weld length. Moreover, as described with reference to FIG. 10, the joint profile between these sections is optionally further managed by incorporating tortuous paths in order to produce a neutron tight joint between the sections. For example, an interlocking castellation approach between sections would achieve a neutron tight joint, e.g. using the joint profile 72 shown in FIG. 10. The principle behind such tortuous joint design is to achieve a barrier to primary neutrons (i.e. emitted from fuel rods) that is independent of the incident angle of approach. Other joint management approaches can be used in addition to or alternative to the use of tortuous paths at the joints. Friction stir welding could also be used to weld the sections together. Friction stir welding has been demonstrated before on Al-SiC MMC materials with good success. Friction stir welding is a solid state joining technique that physically stirs and welds the material together across the joint. Friction stir welding would be attractive for neutron tight joints as the $B_4C$ ceramic would be stirred and distributed across the weld.

Yet another advantage of the disclosed NNS-HIP cask manufacturing approach is that higher volume fractions of $B_4C$ are achievable. The maximum volume fraction of neutron absorbing $B_4C$ ceramic is limited to about 30 wt % $B_4C$ by the requirement to hot extrude or hot roll the composite material. At higher volume fractions of $B_4C$ it becomes difficult to either roll or extrude the material as the material tends to crack. Higher volume fractions (>40% wt % $B_4C$ in some embodiments, and >60 wt % $B_4C$ in other embodiments) of composites can be produced by NNS-HIP combined with mechanically alloyed powder as no extra extrusion or rolling is required to homogenize the $B_4C$ distribution. The higher loading of $B_4C$ ceramic produces a more volumetric effective absorber compared to extruded or rolled techniques.

Still further, the NNS-HIP manufacturing used in conjunction with HIP bonded clad layers on inner and/or outer surfaces (e.g., the outer and/or inner hollow cylindrical cladding 30, 60 described herein as illustrative examples) offers improved corrosion resistance of the cask liners. Further, the HIP can material maybe be specifically chosen to produce the desired corrosion resistance. This is of particular value in wet storage casks, such as are sometimes used during initial casking after removal of spent fuel from the nuclear reactor. In some wet storage arrangements, a corrosive sodium borate solution may be used (e.g., in a cooling pond) to aid in neutron absorption. The Al-$B_4C$ composite core can advantageously limit corrosion by sodium borate or other agents by being totally enclosed within a relatively inert pure aluminum or other suitable aluminum composition cladding with minimal exposed edges to provide sites for corrosion. The present specification has been set forth with reference to exemplary embodiments. Modifications and alterations will occur to others upon reading and understanding the present specification. It is intended that the present disclosure be construed as including all such modifications and alterations insofar as they come within the scope of the appended claims or the equivalents thereof.

The invention claimed is:

1. A cask liner for a nuclear fuel cask, the cask liner comprising:
    a hollow cylinder including a boron-containing composition;
    wherein the hollow cylinder has no longitudinal joints.

2. The cask liner of claim 1 wherein the boron-containing composition includes a boron-containing aluminum metal matrix composite (Al MMC).

3. The cask liner of claim 1 wherein the boron-containing composition includes a B4C aluminum metal matrix composite (Al-B4C MMC).

4. The cask liner of claim 1 wherein the boron-containing composition includes aluminum or an aluminum alloy further comprising a boron containing ceramic.

5. The cask liner of claim 1 wherein the boron-containing composition includes at least 10 wt % boron.

6. The cask liner of claim 1 further comprising:
    a hollow cylindrical cladding including aluminum or an aluminum alloy;
    wherein the hollow cylindrical cladding is disposed on at least one of an inside surface and an outside surface of the hollow cylinder.

7. The cask liner of claim 6 wherein the hollow cylindrical cladding has no longitudinal joints.

8. The cask liner of claim 6 wherein the hollow cylindrical cladding is formed together with the hollow cylinder by isostatic pressing.

9. The cask liner of claim 1 further comprising:
    a cover including the boron-containing composition disposed at an end of the hollow cylinder and sealing the end of the hollow cylinder.

10. The cask liner of claim 9 wherein there are no joints between the cover and the end of the hollow cylinder.

11. The cask liner of claim 9 wherein the hollow cylinder and the cover are formed as a single unit by isostatic pressing.

12. The cask liner of claim 1 wherein an end of the hollow cylinder has a recess and/or protrusion.

13. The cask liner of claim 12 comprising at least two said hollow cylinders arranged end to end with the recess and/or protrusion of proximate ends engaging to define a tortuous path extending from inside the hollow cylinders to outside the hollow cylinders.

14. The cask liner of claim 1 wherein the hollow cylinder is tapered over at least a portion of a longitudinal length of the hollow cylinder.

15. The cask liner of claim 1 wherein the hollow cylinder has a rectangular, hexagonal, or circular cross-section.

16. A cask liner for a nuclear fuel cask, the cask liner comprising:
    a hollow cylinder including a boron-containing composition;
    wherein the hollow cylinder is formed as a single unit by isostatic pressing.

17. The cask liner of claim 16 wherein the hollow cylinder is formed as the single unit by hot isostatic pressing (HIP) of a mixture of a boron-containing powder and an aluminum or aluminum alloy powder where the boron-containing powder is distributed in the aluminum or aluminum allow powder by mechanical alloying.

18. A method of manufacturing a cask liner for a nuclear fuel cask, the method comprising:
    isostatic pressing a boron-containing composition to form cask liner in the shape of a hollow cylinder.

19. The method of claim 18 wherein the hollow cylinder is formed without any longitudinal joints.

20. The method of claim 18 wherein the isostatic pressing is hot isostatic pressing (HIP).

21. The method of claim 18 further comprising:
    producing the boron-containing composition by mechanical alloying of a boron-containing powder and an aluminum or aluminum alloy powder.

22. The method of claim 18 wherein the boron-containing composition includes a boron-containing aluminum metal matrix composite (Al MMC).

23. The method of claim 18 wherein the boron-containing composition includes a B4C aluminum metal matrix composite (Al-B4C MMC).

24. The method of claim 18 wherein the boron-containing composition includes at least 10 wt % boron.

25. A nuclear fuel cask liner manufactured by a method as set forth in claim 18.

* * * * *